C. G. HALL.
CHECKER BOARD.
APPLICATION FILED MAR. 12, 1917.
1,256,999.
Patented Feb. 19, 1918.
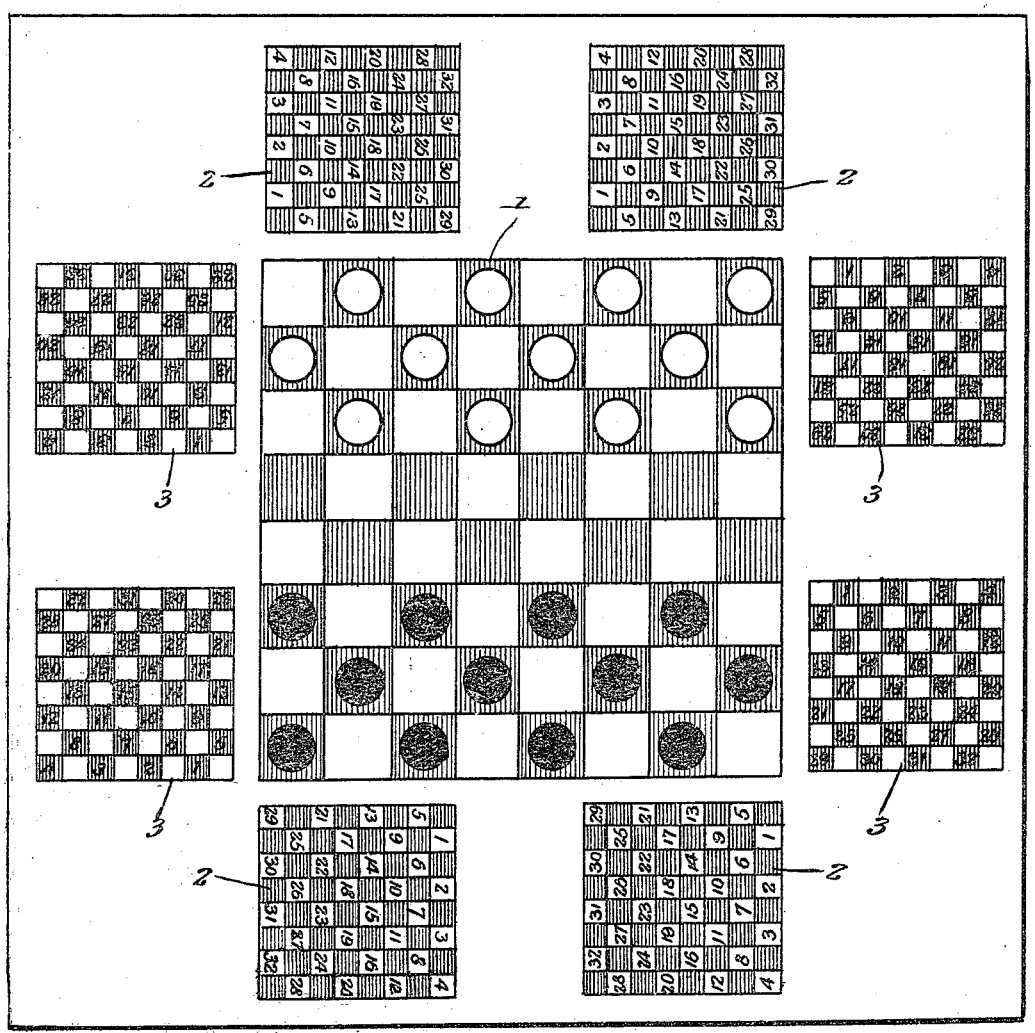

UNITED STATES PATENT OFFICE.

CASSIUS G. HALL, OF ADAMS CENTER, NEW YORK, ASSIGNOR TO ELLEN A. TITSWORTH, OF ADAMS CENTER, NEW YORK.

CHECKER-BOARD.

1,256,999.    Specification of Letters Patent.    Patented Feb. 19, 1918.

Application filed March 12, 1917. Serial No. 154,387.

*To all whom it may concern:*

Be it known that I, CASSIUS G. HALL, a citizen of the United States, residing at Adams Center, in the county of Jefferson and State of New York, have invented a new and useful Checker-Board, of which the following is a specification.

My invention relates to improvements in checker-boards; in it small checker-boards, eight in number, the squares of which are numbered according to custom and rule, are placed, two at each end, or side, of the four ends (or sides) of a larger checker-board, the squares of which are not numbered, for the purpose of enabling those persons who have not learned the numbers of the squares to play published games of checkers of books, newspapers, etc.;—to facilitate the memorizing of the numbers of the squares of a checker-board;—to supply a needed ready prompter for the amateur;—and to furnish a handy aid for the professional when studying and practising.

I attain these objects by the numbering and the arranging of the said small checker-boards at the ends, or sides, of the said larger checker-board as illustrated in the accompanying drawing: 1 is the said larger checker-board and 2, 2, 2, 2 and 3, 3, 3, 3 the said eight, numbered, small checker-boards numbered on the white (light) and black (dark) squares, respectively, the said eight, numbered, small checker-boards so placed at the ends, or sides, of the said larger checker-board that each player will have on his right hand, in correct (upright) position a numbered small checker-board, and on his left hand a numbered small checker-board, "turned" (reversed), but the numbers thereon upright, whether the game be played on the white (light) or on the black (dark) squares.

There are famous games to which names have been given (as "Ayrshire Lassie") and certain moves begin these games. The moves that begin a game are called an "opening." To demonstrate the simple manner of using my invention, I employ the opening of "The Old Fourteenth:"

Black (pieces or men).   White (pieces or men).
     11—15                 23—19
      8—11                 22—17
      4—8                  - - - - -

The player who has the black men finds eleven and fifteen on the small checker-board at his left hand and on the said larger checker-board moves the man on square eleven to square fifteen, the player who has the white men then finds on the small checker-board at his right hand the squares twenty-three and nineteen and on the said larger checker-board moves the man on square twenty-three on to square nineteen. This procedure is continued until all the numbers of a game are played.

With the help of my invention the novice can play printed scientific games, but without numbers he could not play from books, etc.

The checker-board is "turned" (reversed) at the close of each game so that each player may have the first move an equal number of times and an even number of games should be played—hence the arranging of a small checker-board in the same manner on every end, or side, of the said larger checker-board.

For Polish Checkers the squares of the small checker-boards would be increased to one hundred squares and the numbers thereon to conform to that game.

I claim:

1. A checker-board that has eight small checker-boards, the squares of which are numbered according to custom and rule, placed around a larger checker-board, two along, or at, each of the four ends, or sides, thereof, arranged so that each player, whether the game be played on the light squares or on the dark squares, will have on his right hand, in correct position, one of the said small checker-boards and will also have on his left hand one of the said small checker-boards "turned" (reversed), but the numbers thereon upright but reading from right to left as shown in the drawing and explained in the specification.

2. In a checker-board, a main playing board and a plurality of smaller auxiliary boards each of the smaller boards being so arranged that each player will have a board reading right side up whether playing with the white men or the black men.

CASSIUS G. HALL.

Copies of this patent may be obtained for five cents each, by addressing the "Commissioner of Patents, Washington, D. C."